United States Patent [19]

Bloomberg et al.

[11] Patent Number: 5,048,109

[45] Date of Patent: Sep. 10, 1991

[54] DETECTION OF HIGHLIGHTED REGIONS

[75] Inventors: Dan S. Bloomberg, Palo Alto; Henry W. Sang, Jr., Cupertino; Lakshmi Dasari, Palo Alto, all of Calif.

[73] Assignee: Xerox Corporation, Rochester, N.Y.

[21] Appl. No.: 447,985

[22] Filed: Dec. 8, 1989

[51] Int. Cl.$^5$ .......................... G06K 9/38; G06K 9/34
[52] U.S. Cl. ......................................... 382/50; 382/9; 382/41
[58] Field of Search .......................... 382/50, 41, 48, 9

[56] References Cited

U.S. PATENT DOCUMENTS

| | | | |
|---|---|---|---|
| 4,196,453 | 4/1980 | Warren | 358/283 |
| 4,411,015 | 10/1983 | Scherl et al. | 382/51 |
| 4,414,685 | 11/1983 | Sternberg | 382/49 |
| 4,503,556 | 3/1985 | Scherl et al. | 382/9 |
| 4,504,972 | 3/1985 | Scherl et al. | 382/51 |
| 4,513,442 | 4/1985 | Scherl | 382/49 |
| 4,577,235 | 3/1986 | Kannapell et al. | 358/280 |
| 4,644,392 | 2/1987 | Yamada | 358/75 |
| 4,700,400 | 10/1987 | Ross | 382/27 |
| 4,724,488 | 2/1988 | Van Daele et al. | 358/282 |
| 4,742,558 | 5/1988 | Ishibashi et al. | 382/56 |
| 4,750,209 | 6/1988 | Shimura et al. | 382/9 |
| 4,760,606 | 7/1988 | Lesnick et al. | 382/48 |
| 4,786,976 | 11/1988 | Takao et al. | 358/283 |
| 4,791,679 | 12/1988 | Barski et al. | 382/55 |
| 4,805,031 | 2/1989 | Powell | 358/284 |
| 4,817,186 | 3/1989 | Goolsbey et al. | 382/9 |
| 4,821,333 | 4/1989 | Gillies | 382/49 |
| 4,823,194 | 4/1989 | Mishima et al. | 358/282 |
| 4,827,330 | 5/1989 | Walsh et al. | 358/280 |
| 4,827,529 | 5/1989 | Peppers et al. | 382/9 |
| 4,850,025 | 7/1989 | Abe et al. | 382/9 |
| 4,858,018 | 8/1989 | Tanaka | 358/456 |
| 4,868,884 | 9/1989 | Miyazaki et al. | 382/50 |

FOREIGN PATENT DOCUMENTS

| | | |
|---|---|---|
| 0251237 | 1/1988 | European Pat. Off. . |
| 0287995 | 10/1988 | European Pat. Off. . |
| 0288266 | 10/1988 | European Pat. Off. . |
| 0308673 | 3/1989 | European Pat. Off. . |
| 61-225974 | 10/1986 | Japan . |

OTHER PUBLICATIONS

Wong et al., "Document Analysis System," *IBM J. Res. Development* (1982) 26:647-656.

Sternberg, "Biomedical Image Processing," *IEEE* (1983) pp. 22-34.

Maragos, "Tutorial on Advances in Morphological Image Processing and Analysis," *Optical Engineering* (1987) 26:623-632.

Haralick et al., "Image Analysis Using Mathematical Morphology," *IEEE*, vol. PAMI-9, No. 4, Jul. 1987, pp. 532-550.

Hase et al., *Systems and Computers in Japan* (1987) 18:77-87.

Primary Examiner—Leo H. Boudreau
Assistant Examiner—Steven P. Fallon
Attorney, Agent, or Firm—Townsend and Townsend

[57] ABSTRACT

A method and apparatus for detection of highlighted regions of a document. A document containing highlighted regions is scanned using a gray scale scanner. Morphology and threshold reduction techniques are used to separate highlighted and non-highlighted portions of the docment. Having separated the highlighted and non-highlighted portions, optical character recognition (OCR) techniques can then be used to extract text from the highlighted regions.

68 Claims, 13 Drawing Sheets

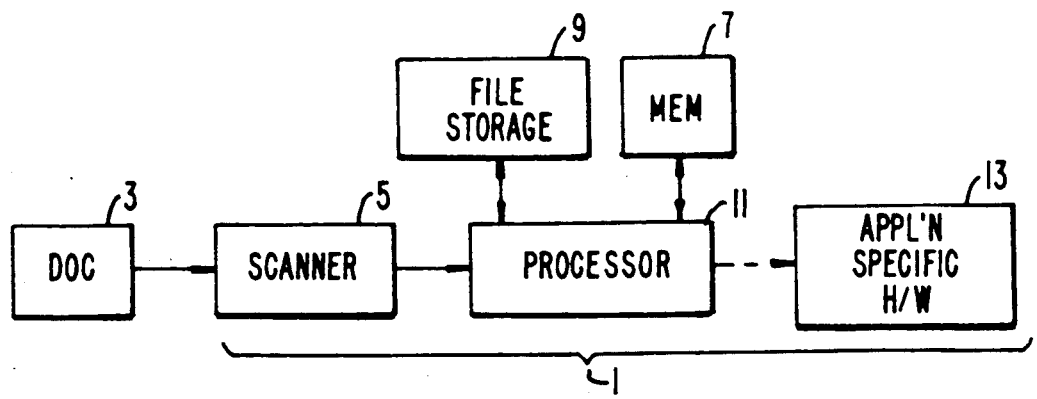
FIG._1a.
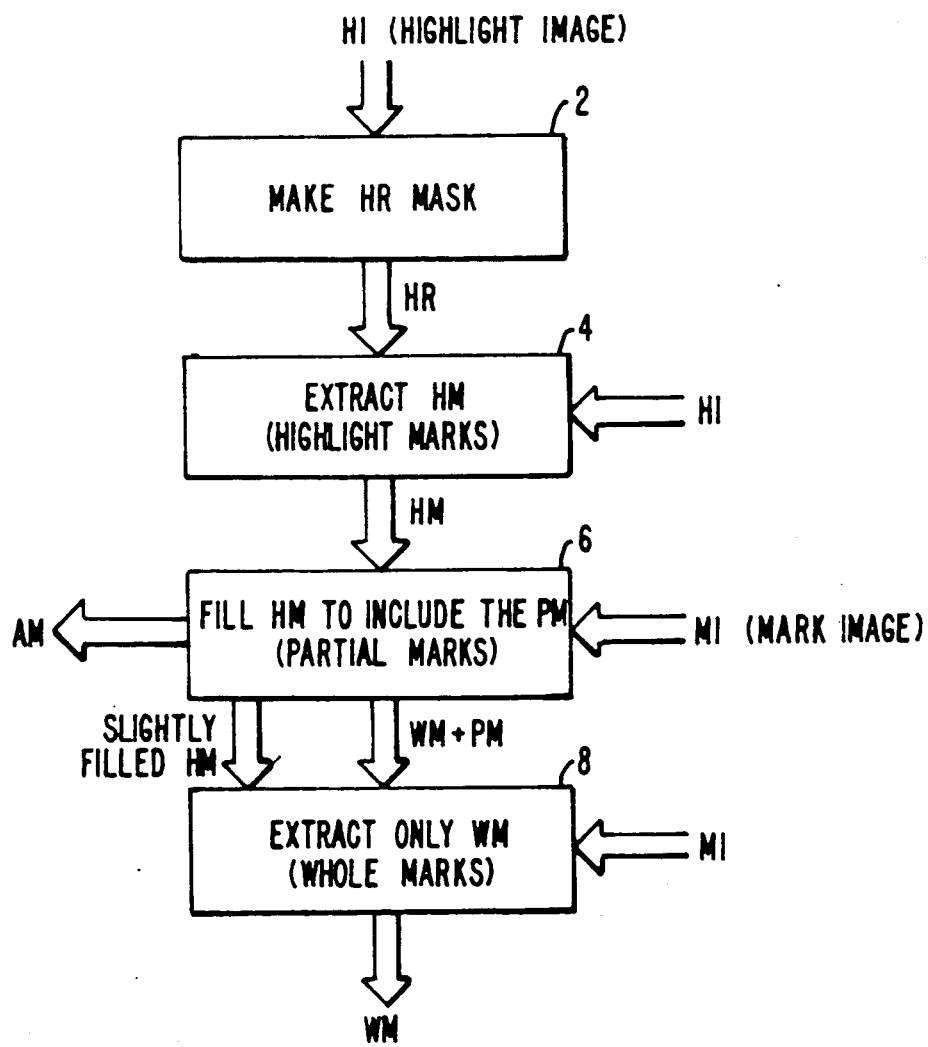
FIG._1b.

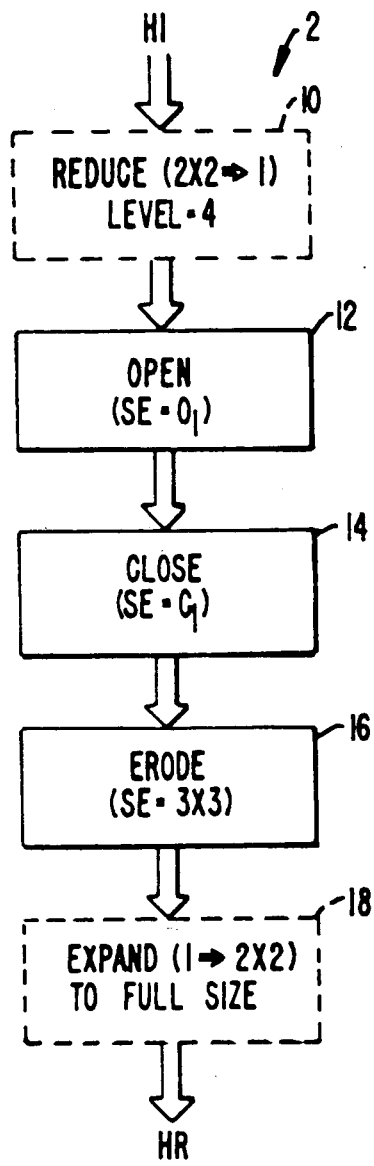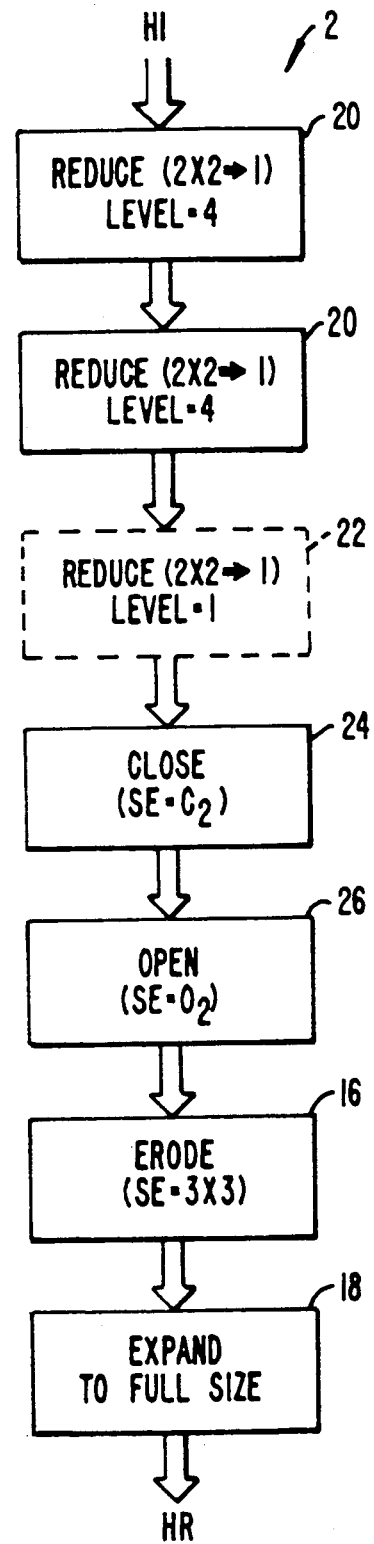
FIG._2a.
FIG._2b.

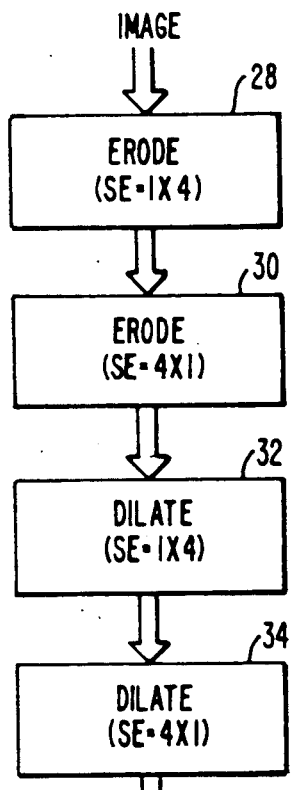
FIG._3a.
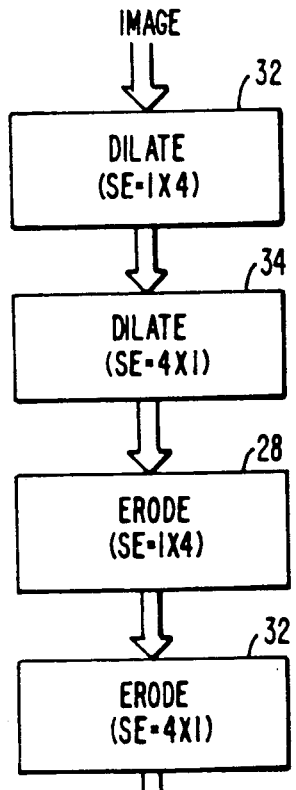
FIG._3b.
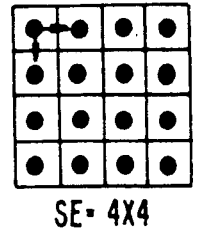
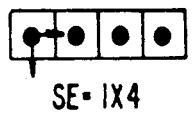
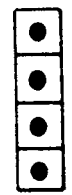
FIG._3c.
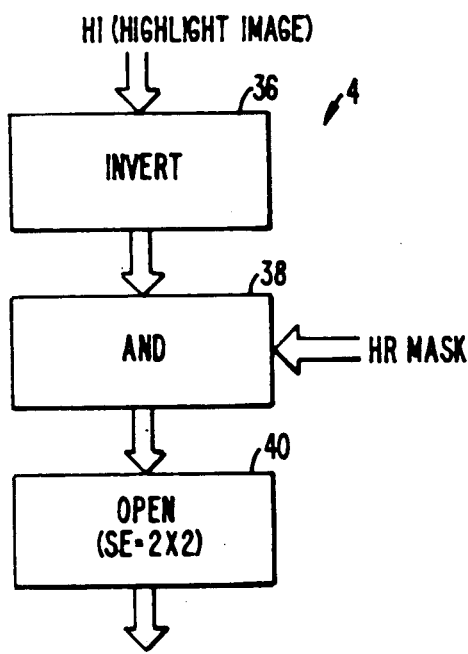
FIG._4.
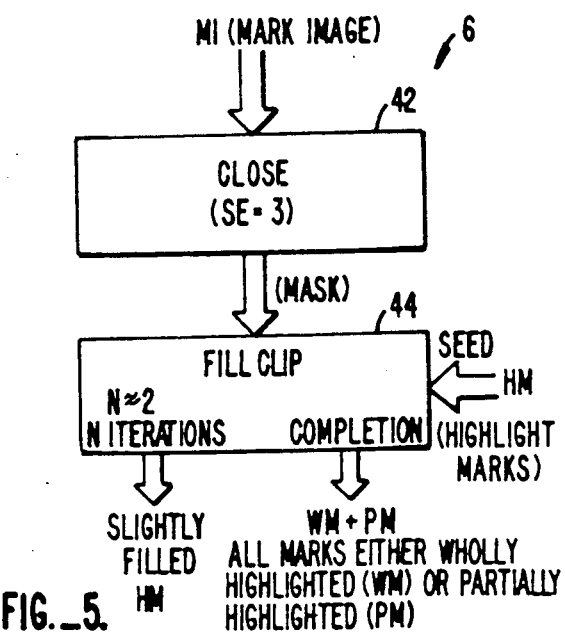
FIG._5.

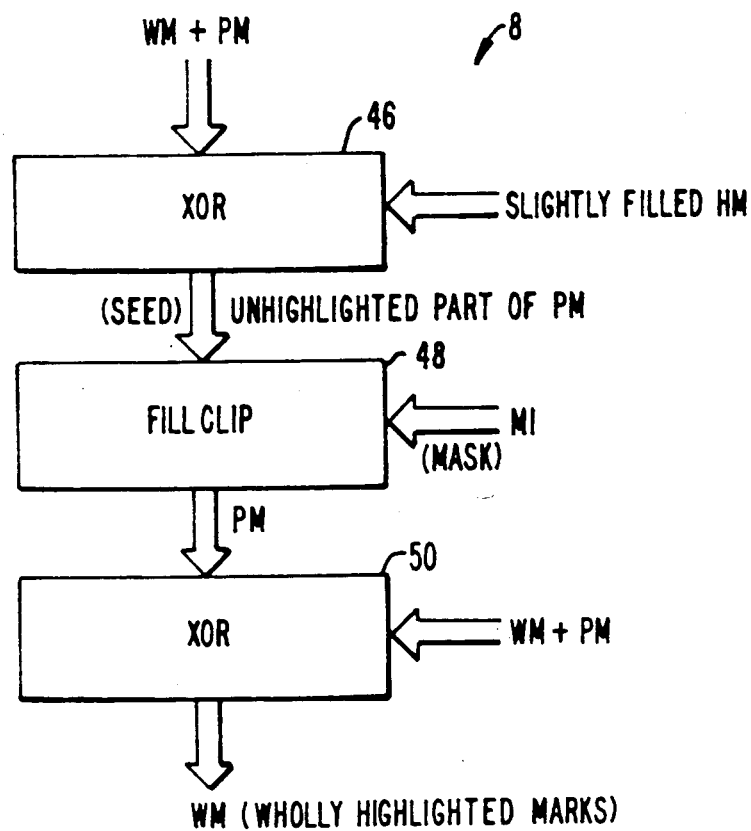
FIG._6.
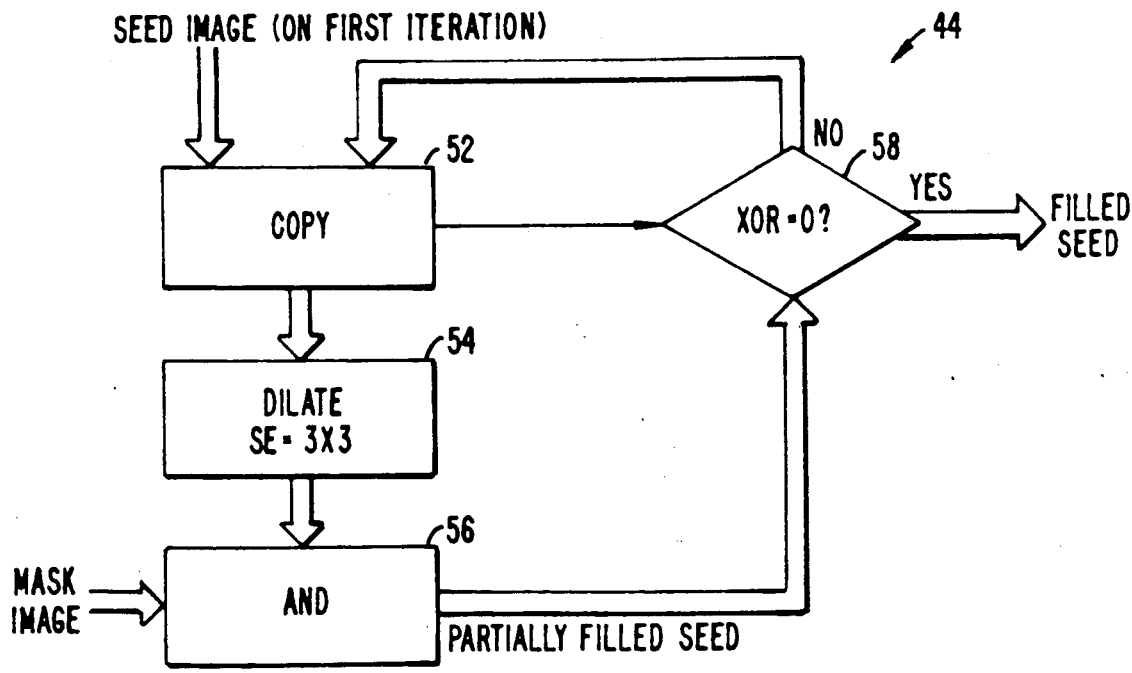
FIG._7.

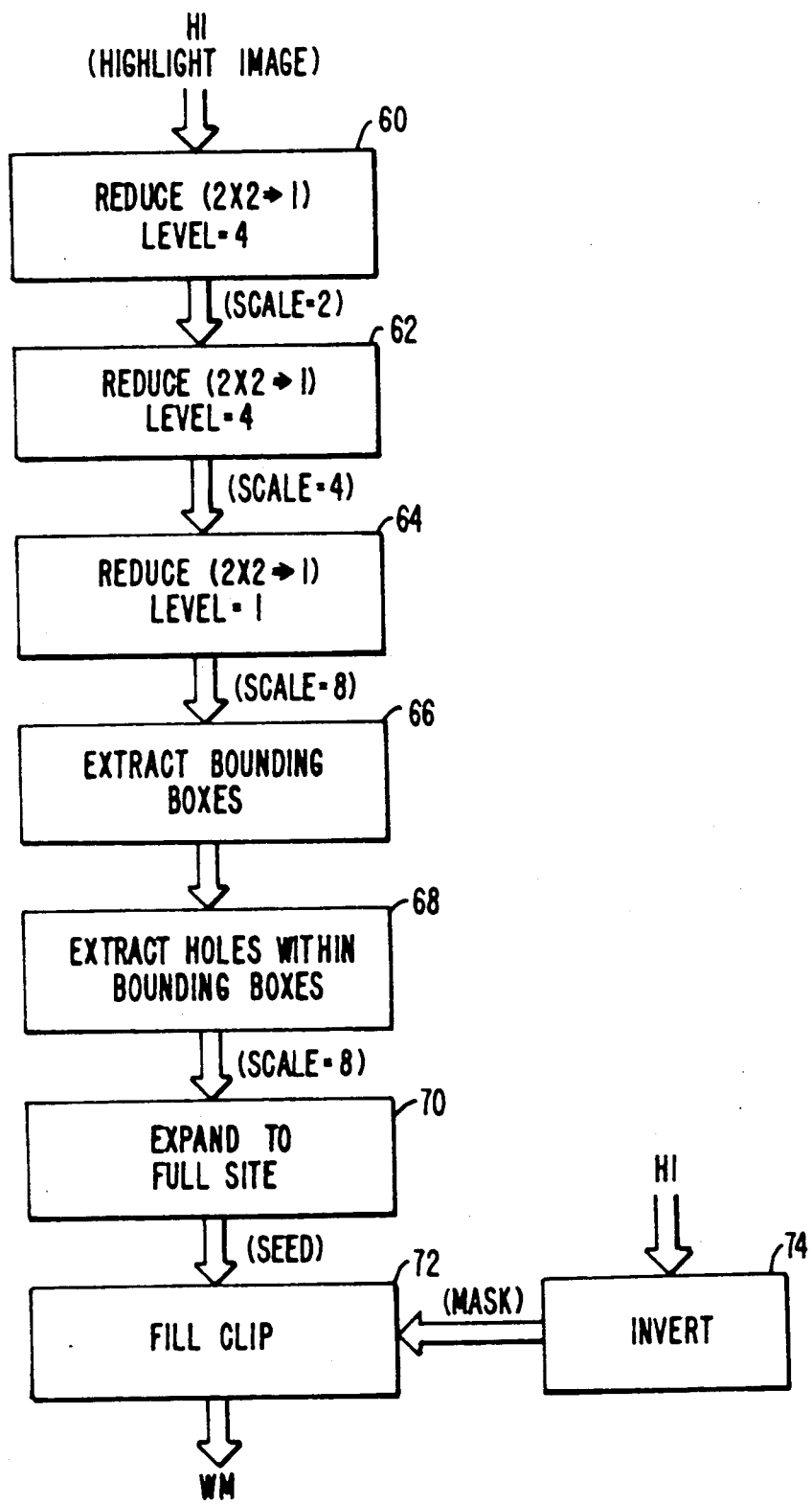
FIG._8.

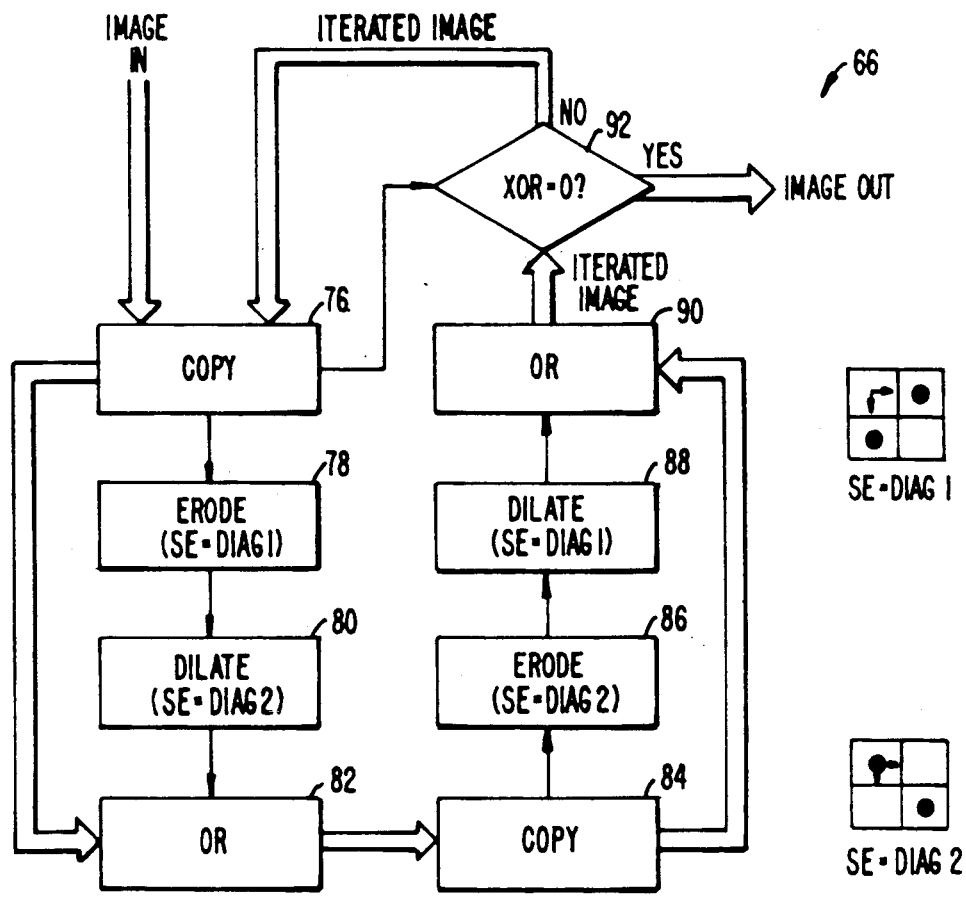
FIG._9.
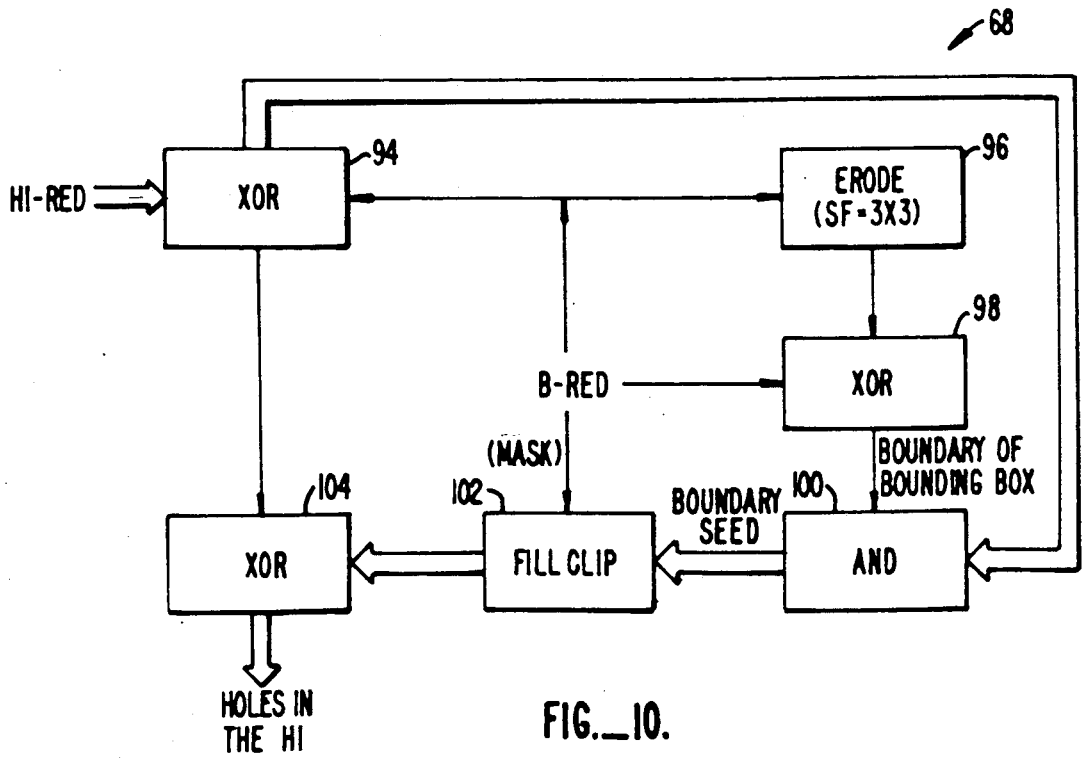
FIG._10.

1. ◯ $\xrightarrow{\text{FILL 8}}$ ■ ~91

2. ◯ XOR ■ → ▨ ~93

3. ■ XOR ( ■ ⊖ $S_{3\times3}$ ) → □

4. ▨ ∩ □ → ⌐¬ ~95
                    L_J

5. ⌐¬ $\xrightarrow{\text{FILL CLIP}}$ ◣◢
   L_J                                  ◤◥

6. ( ◯ ∪ ◣◢ ) XOR ■ → ●
          ◤◥

FIG._II.

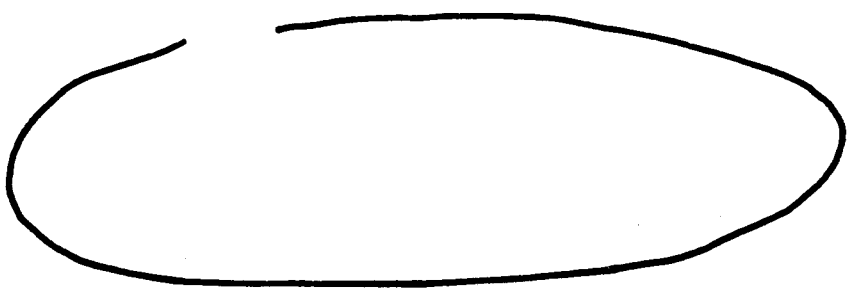
FULL-SIZED CONTOUR
FIG._12a.
REDUCED CONTOUR
FIG._12b.
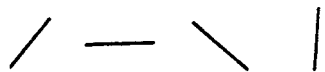
SEs
FIG._12c.
AFTER FIRST ROUND OF CLOSING BY THE SEs
FIG._12d.
AFTER THE SECOND ROUND OF CLOSING BY THE SEs
FIG._12e.

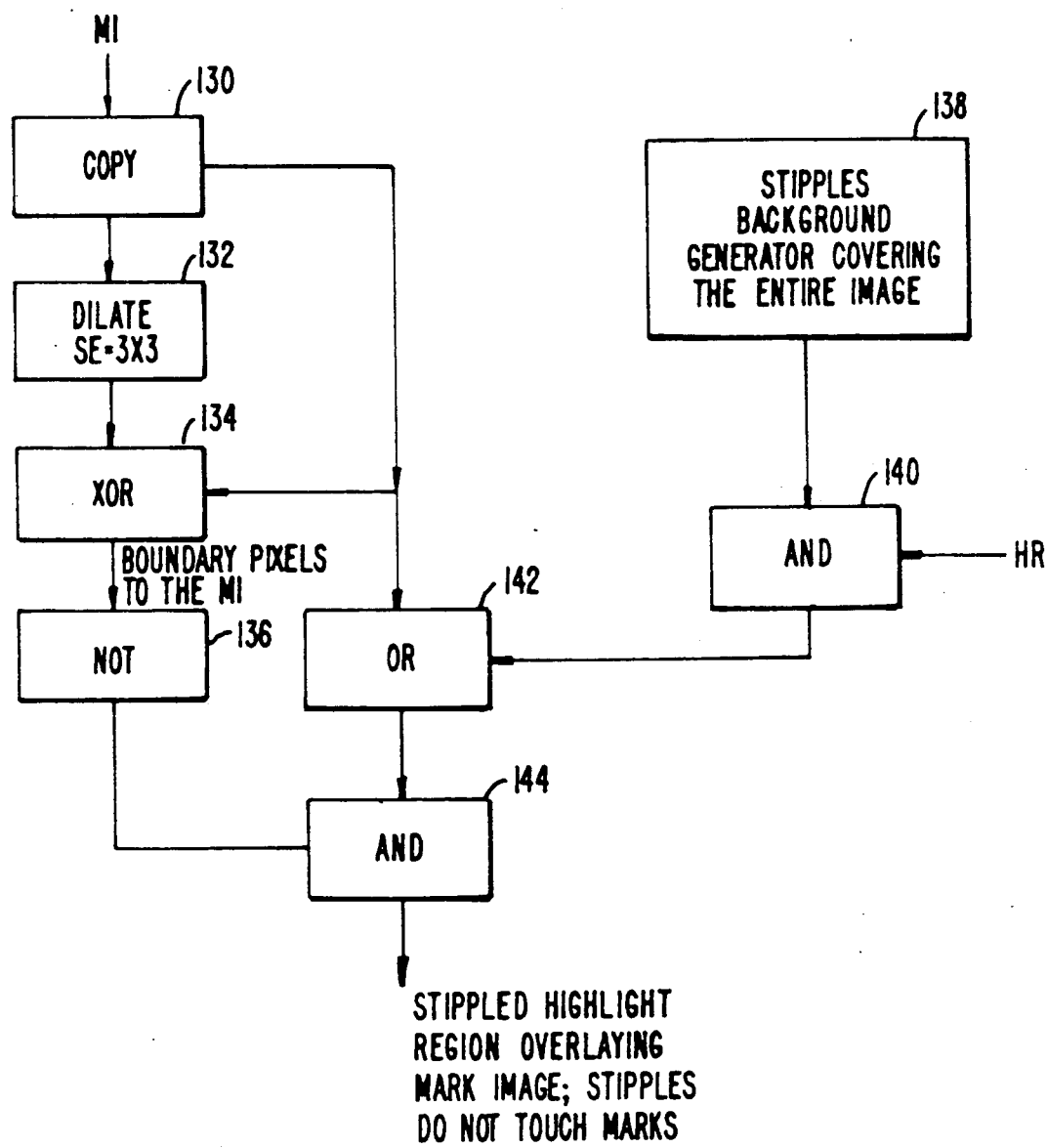
FIG._13.

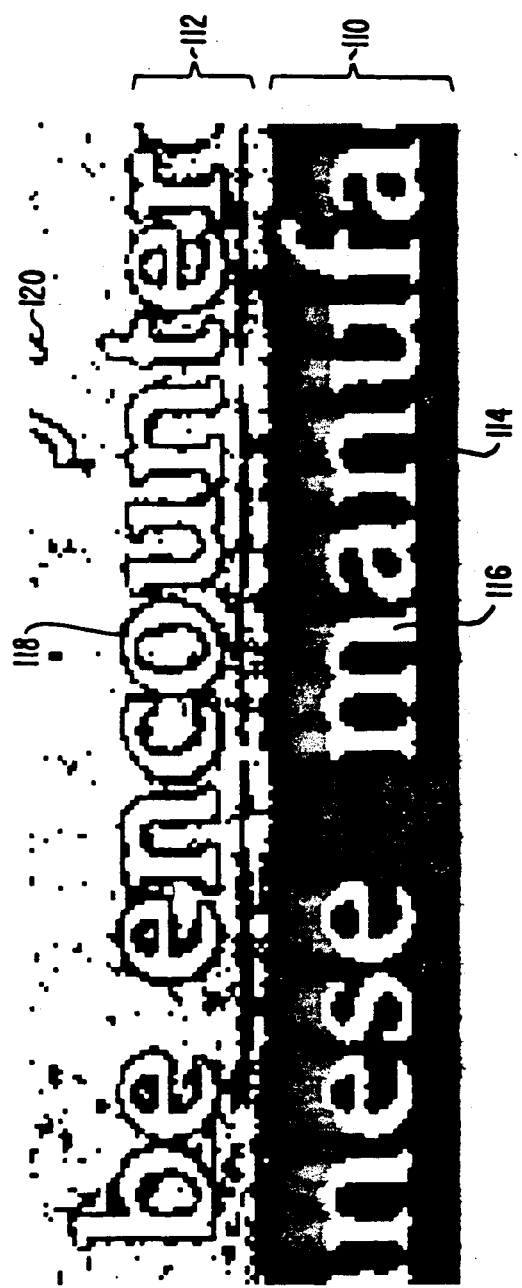
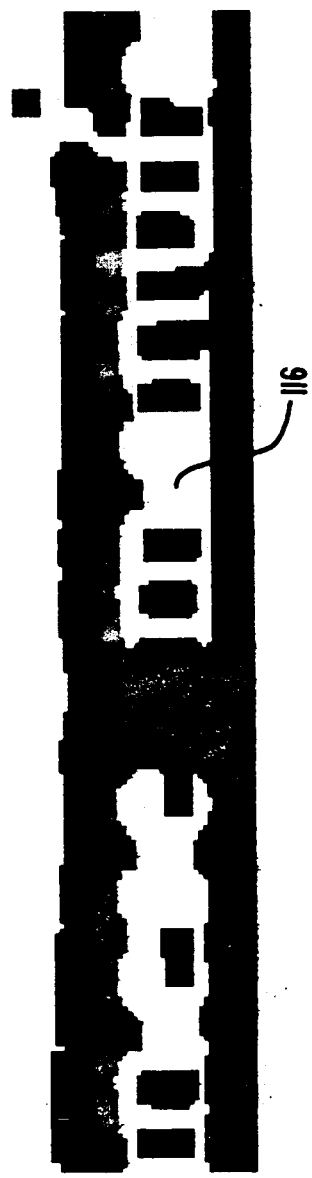
FIG._14A.
FIG._14B.
FIG._14C.

FIG.—14D.
FIG.—14E.

FIG._15A.
FIG._15B.
FIG._15C.

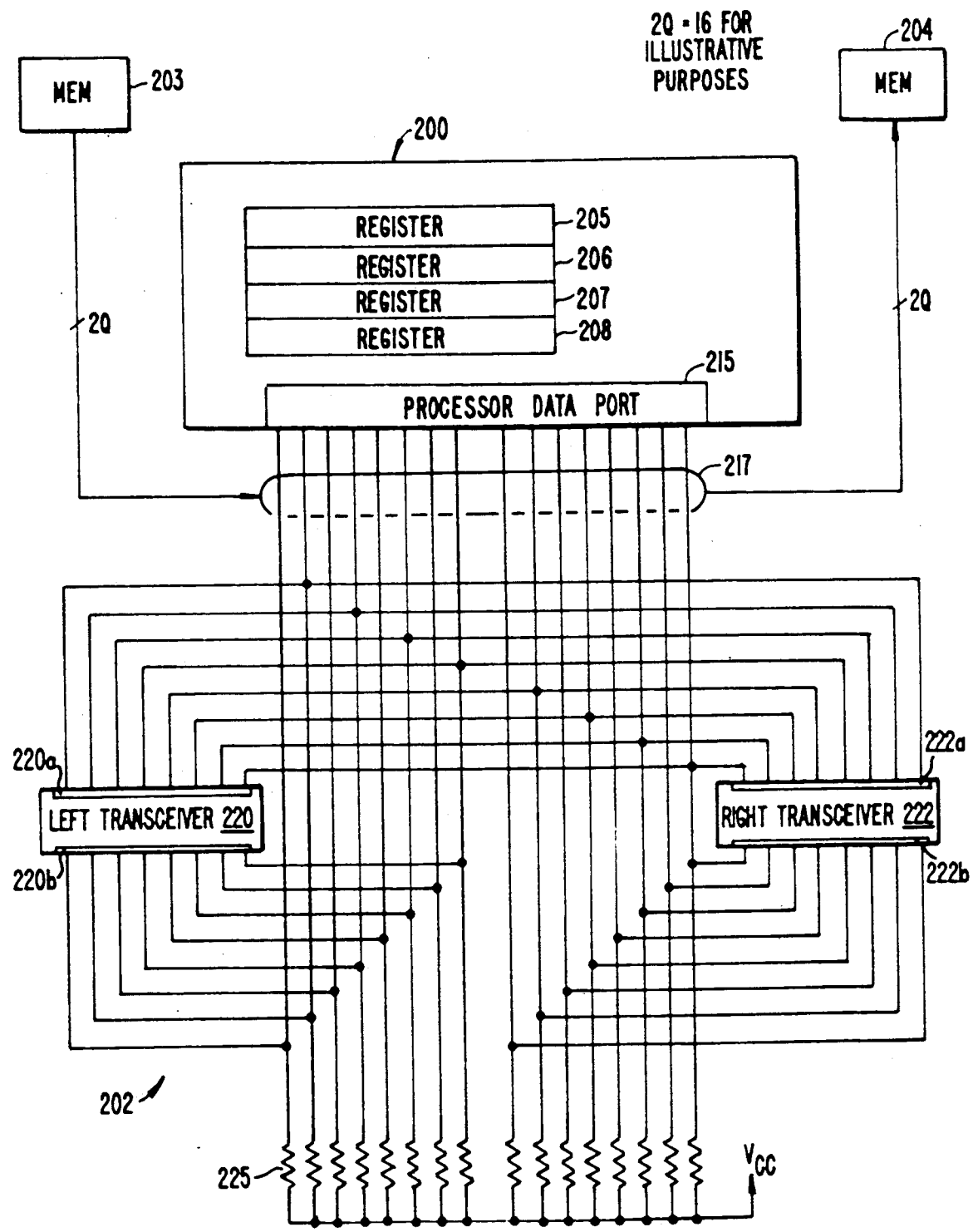
FIG._16.

DETECTION OF HIGHLIGHTED REGIONS

MICROFICHE APPENDIX

This specification includes microfiche Appendix 1 having 2 sheets with 166 frames.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to image processing, and more specifically to a technique for discriminating between and extracting regions of a document which have been highlighted and regions of a document which have not been highlighted.

Often, it is desirable to differentiate between regions of a document which have been "highlighted" with, for example, a highlight pen from regions of a document which have not been highlighted. By "highlighted" it is intended to mean herein that first marks in a document have been differentiated from remaining marks of the document by a region which has a substantially different gray scale than the background or marks of the original document. Such marks could be made, for example, by way of well known "Hi-Liter" pens, "Major Accent" pens, and other pens which produce bright but relatively transparent colors.

A variety of methods have been proposed for detection of highlighted regions in a document. For example, the use of a color scanner has been proposed to detect regions of a document which have been highlighted in a color different than the remainder of the document. Other processing methods utilize detection of an image which may include shadow, midtone, and bright portions. The midtone portion may be screened with a low frequency screen to convert the image to binary form.

While meeting with some success, prior methods of detecting highlighted regions have met with certain limitations. For example, the use of a color scanner would limit the user to segregation of only original documents or color copies thereof. Further, color scanners are complex and, therefore, expensive. Other methods are not reliable, expensive, slow, or the like in many applications. Some methods fail to detect intended characters which are not fully highlighted and some unintended characters which have been partially highlighted.

From the above it is seen that an improved method and apparatus for detection of highlighted regions of a document is desired.

SUMMARY OF THE INVENTION

The invention is drawn to a technique for detection of highlighted regions of a document. A document containing highlighted regions is scanned using a gray scale scanner. Morphological operations and, optionally, threshold reduction techniques are used to separate highlighted and non-highlighted portions of the document. Having separated the highlighted and non-highlighted portions, optical character recognition (OCR) techniques can then be used to extract text from the highlighted regions.

Accordingly, in one embodiment the invention comprises, in a digital computer, the steps of inputting a grayscale image of a first image; and identifying a location of at least one mark in the first image using the grayscale image, the at least one mark at least partially surrounded by a region having a non-white grayscale substantially different than a grayscale of the mark, the step of identifying a location further comprising the step of converting said region having a non-white grayscale substantially different than the mark to a substantially solid region, the substantially solid region comprising the location of the at least one mark.

A further understanding of the nature and advantages of the inventions herein may be realized by reference to the remaining portions of the specification and the attached drawings.

BRIEF DESCRIPTION OF THE DRAWINGS

FIG. 1A and 1B are overall block diagrams illustrating the hardware and the method for detection of highlighted regions according to one embodiment of the invention, respectively;

FIGS. 2A and 2B are block diagrams of alternative methods for extraction of a highlighted regions mask from the highlighted image;

FIGS. 3A and 3B are block diagrams of a separable OPEN with a 4×4 structuring element, and a separable CLOSE with a 4×4 structuring element, while FIG. 3C illustrates the SEs used in FIGS. 3A and 3B;

FIG. 4 is a block diagram of the procedure for extraction of highlighted marks from the highlight image and highlight region mask;

FIG. 5 is a block diagram of the procedure for a fill from the highlight mask to include the partial marks;

FIG. 6 is a block diagram of removal of partially highlighted marks from the highlight mask so as to leave only whole marks;

FIG. 7 is a block diagram of a generic FILLCLIP operation in which the seed is filled to include all 8-connected regions in which there was initially at least one ON pixel;

FIG. 8 is a block diagram of direct extraction of wholly highlighted marks from the highlight image alone;

FIG. 9 is a block diagram of a FILL8 of connected regions to the smallest enclosing rectangular bounding boxes. Double arrows show the flow of the image while single arrows show intermediate computation;

FIG. 10 is a block diagram of extraction of holes in the highlight image using the highlight image and the boundary boxes of the marks;

FIG. 11 illustrates graphically, the extraction of pixels from the confines of an enclosed loop;

FIGS. 12A to 12E illustrate detection of marks in a circled region;

FIG. 13 illustrates monochrome copying such that highlighted regions are surrounded by stipples which do not touch the highlighted marks;

FIGS. 14A to 14E illustrate, in graphic form, operation of one embodiment of the invention;

FIGS. 15A to 15C illustrate operation of the invention according to a second embodiment; and FIG. 16 illustrates a hardware implementation for a reduction technique used herein.

DESCRIPTION OF THE PREFERRED EMBODIMENTS

Contents

A. Definitions and Terminology
B. Overview of The Invention
C. Detailed Discussion of One Embodiment of the Invention
D. Discussion of Illustrative Alternative Methods
1. General
2. Extraction of Highlight Regions in a Copier
   a. Color Copier Applications
   b. Monochrome Copier Applications
3. Hybrid Resolution System
4. Highlighting by Circling With a Color Highlight Mark
5. Extraction of the Inside of Loops From Marks Composed of ON Pixels
E. Discussion of the Software
F. Graphical Illustration
G. Fast Thresholded Reduction (and Expansion) of Images
H. Conclusion

A. Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white. In some cases the discussion makes reference to a "don't care" pixel which may be either an ON or an OFF pixel.

A "solid region" of an image refers to a region extending many pixels in both dimensions within which substantially all the pixels are ON.

A "textured region" of an image refers to a region that contains a relatively fine-grained pattern. Examples of textured regions are halftone or stippled regions.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g., upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

A number of morphological operations map a source image onto an equally sized destination image according to a rule defined by a pixel pattern called a structuring element (SE). The SE is defined by a center location and a number of pixel locations, each having a defined value (ON or OFF). The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SEs used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

"Fillclip" is a morphological operation where one image is used as a seed and is "grown" morphologically, clipping it at each growth step to the second image.

"Fill8" is an image operation in which an 8-connected region is filled to minimum rectangular bounding boxes.

A "mask" refers to an image, normally derived from an original image, that contains substantially solid regions of ON pixels corresponding to regions of interest in the original image. The mask may also contain regions of ON pixels that do not correspond to regions of interest.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

Certain abbreviations are also used throughout the text and figures herein. Illustrative definitions for these abbreviations are included below:

HI refers to a highlight image, which is generally formed by band passing all pixels within highlight peaks in a grayscale histogram.

MI refers to the mark image which is generally formed from a gray scale image by threshholding and passing those pixels corresponding to dark marks (e.g., text) in the image.

HR refers to the highlight region, which is generally a mask of ON pixels.

HM refers to the highlight marks, which are generally those marks or portions of marks that are within the HR.

WM refers to whole marks, which are generally those marks which are entirely highlighted.

PM refers to partial marks, which are generally those marks that are partially highlighted; the HM (highlight marks) are generally equal to the WM (whole marks) plus the PM (partial marks) that fall within the HR (Highlighted Region).

AM (all marks) refers to the entirety of all marks that are either partially or entirely highlighted.

B. Overview of the Invention

The present invention provides a method and apparatus for identifying highlighted marks and regions in a document. The capability to identify and distinguish highlighted regions on a document will have a number of uses. For example, after location of highlighted regions, OCR techniques could be used to retrieve information contained in the highlighted region. Therefore, a user of the methods disclosed herein could mark a selected portion of a large number of documents using a conventional color highlight pen, have the information within these regions extracted from the documents, and use such information in an index in a computer data base. Alternatively, a user could highlight a facsimile telephone number on a document. A facsimile machine could then detect the highlighted region, read the phone number therein using well known OCR techniques, and automatically dial the number. In other applications, a user may circle a portion of a document using a color pen, and the information within the circled region may be extracted. Other uses include detection of color in a copy machine followed by printing of the document when the colored regions are either printed in color (if the copy machine prints in color) or printed with gray stipples (if the copy machine prints monochrome). Of course, the above uses are only illustrative and a wide variety of uses of the invention will be readily apparent to those of skill in the art.

The invention provides not only a method for detecting highlighted regions but also a method for showing or retrieving in their entirety characters or marks which have been only partially highlighted. In alternative embodiments the invention provides for elimination of characters or marks which are only partially highlighted. In still further embodiments the invention provides for identification of a region somewhat larger than a highlighted region such that most characters which are only partially highlighted will be retrieved.

FIG. 1A is a block diagram of an image analysis system 1 within which the present invention may be embodied. The basic operation of system 1 is to extract or eliminate certain characteristic portions of a document 3. To this end, the system includes a scanner 5 which digitizes the document on a pixel basis, and provides a resultant data structure. The scanner preferably provides a gray scale image (a plurality of bits per pixel). This data structure contains the raw content of the document, to the precision of the resolution of the scanner. This data structure, typically referred to as an image, may be sent to a memory 7 or stored as a file in a file storage unit 9, which may be a disk or other mass storage device.

A processor 11 controls the data flow and performs the image processing. Processor 11 may be a general purpose computer, a special purpose computer optimized for image processing operations, or a combination of a general purpose computer and auxiliary special purpose hardware. If a file storage unit is used, the image is transferred to memory 7 prior to processing. Memory 7 may also be used to store intermediate data structures and possibly a final processed data structure.

The result of the image processing, of which the present invention forms a part, can be a derived image, numerical data (such as coordinates of salient features of the image) or a combination. This information may be communicated to application-specific hardware 13, which may be a printer or display, or may be written back to file storage unit 9.

According to one embodiment of the invention an image of a document which has one or more highlighted portions is stored using a grayscale scan. Scanners which output multiple bits per pixel (grayscale scanners) are well known and include, for example, the Xerox 7650 Scanner. Such scanners may be set to a pixel density of around 300 or higher when text is to be read. Lower densities (e.g., 75/inch or lower) may be acceptable when it is only desirable to detect the presence and location of highlight regions. In still further embodiments, first densities (e.g., 75) may be used to extract the highlight regions while a higher density (e.g., 300) may be used to read the text therein. A grayscale scan of many types of highlighted documents will frequently contain four distinct grayscale regions, i.e., white, single-stroke highlighted, double-stroke highlighted (where highlighted strokes overlap), and black. When such a grayscale scan is binarized using a bandpass filter that accepts the singly or doubly highlighted regions (and not the black or white regions) the result is an image that contains:

1. Outlines of un-highlighted marks such as characters and lines.

2. Nearly solid dark regions in areas containing highlight color. The nearly solid dark regions of highlight areas will be interspersed by holes (OFF pixels).

3. White (OFF) regions within the dark highlighted regions where the characters and marks were previously located. Therefore, within the highlighted regions, the resulting image has the appearance of a "reverse" of the original image.

The image resulting from the above steps is referred to as a "highlight image" (HI). The invention herein provides for processing of the highlight image (HI) using morphological processing and, optionally, special reduction operations to transform regions according to their texture.

Referring to FIG. 1B, in step 2, a HR mask is produced from the HI by removing pixels from unhighlighted areas (where only thin outlines of characters exist), while retaining the highlighted regions in their entirety. This is generally accomplished by removal of noise and filling of the highlighted regions, although not necessarily in this order. Step 2 may optionally provide for adjustment of mask size.

Steps 4, 6, and 8 illustrate a variety of alternative uses of the highlight mask. In step 4 the HR mask and the HI are used to extract the HM, generally by obtaining a bitmap of the marks within each highlighted region. The HM will include only those parts of the actual marks that are covered by the HR. In step 6 the HM are filled so as to recover the entirety of all marks that are highlighted to any extent using a MI, resulting in the AM. In step 8, only the WM are recovered, i.e., only the marks that were entirely highlighted.

The HR mask, the HM, the PM, the AM and the MI can be used in a variety of ways. For example, in some applications, it will only be necessary to make the binary decision as to whether a highlight region is present. In some applications, it may be desirable to determine how many highlighted regions are present. In other applications (e.g., OCR systems) it will be desirable specifically to identify the characters in the highlighted region while in some cases (e.g., copiers) it will be desirable to determine only the coordinates of regions to be printed in color or stipple highlight and, thereby, avoid the expense of a color input scanner.

Detailed Discussion of One Embodiment of the Invention

FIGS. 2A and 2B illustrate in greater detail two alternative methods of producing the HR mask as illustrated in step 2 of FIG. 1B. Referring first to FIG. 2A, the HI is, optionally, reduced to SCALE=2 in step 10 using a thresholded reduction operator with LEVEL=4, i.e., all 4 pixels must be ON in the original in order to produce an ON pixel in the reduced image. By using a reduction, subsequent processing will be faster due to the reduced scale. In step 12 an OPEN operation is conducted, using a sufficiently large SE of solid hit or nearly solid hit entries such that additional and, in most cases, complete removal of noise in un-highlighted regions is obtained. Although solid SEs are used herein for illustration, it will be recognized that SEs with some number of "don't-cares" could also be used in other embodiments. Step 12 is followed by a CLOSE operation in step 14 which fills in the holes in the highlighted regions where the dark marks were located, resulting in substantially solid regions of ON pixels in the highlighted regions. By "substantially solid" it is intended to mean herein that the highlight regions contain large vertical and horizontal runs of ON pixels interspersed by few (e.g., about 10% or less) OFF pixels. Typical values for the solid SEs used in steps 10-14 are illustrated in Table 1.

TABLE 1

| Typical SCALE. OPEN and CLOSE Values | |
|---|---|
| SCALE = 1: | OPEN (6 × 6) |
|  | CLOSE (20 × 20) |
| SCALE = 2: | OPEN (3 × 3) |
|  | CLOSE (15 × 15) |

In step 16 the mask is ERODED with, for example, a 3×3 solid SE. Since there are no holes in the mask, the effect of this erosion is to shrink the boundary of the mask by one pixel. After this size adjustment, the mask is, optionally, EXPANDED in step 18 to SCALE=1 (i.e., no reduction) if necessary for extraction of full size marks (e.g., for character recognition).

FIG. 2B illustrates an alternative to the operations in FIG. 2A. In a preferred embodiment, the HI is reduced to SCALE=4 using LEVEL=4 (all four pixels must be on) using two REDUCE steps 20a and 20b and, optionally, reduced once further to SCLAE=8 using step 22 using LEVEL=1. Of course, a variety of options are available in place of the reductions illustrated in FIG. 2B. For example, rather than two reductions by SCALE=2, a similar result may be obtained by a single reduction at SCALE=4. Alternatively, the HI may be eroded, and then subsampled. Other variations will be apparent to those of skill in the art, with the result that holes in the dark highlight regions are substantially filled, and outlines of characters outside the highlight regions are eliminated.

After two reductions, noise will generally be sufficiently weak that a CLOSE 24 can be conducted before an OPEN 26 without joining noise pixels in such a way that the OPEN is not effective in removing them. The advantage to doing the CLOSE first is that it strengthens the HR mask so that the full highlight region is captured by the mask. Again, the result is a HR mask of substantially solid ON pixels. Typical values used for the SEs according to the process of FIG. 2B are shown in Table 2.

TABLE 2

| Typical SCALE. OPEN and CLOSE Values | |
|---|---|
| SCALE = 4: | OPEN (2 · 2) |
|  | CLOSE (10 · 10) |
| SCALE = 8: | OPEN (1 · 1) |
|  | CLOSE (4 · 4) |

As in FIG. 2A, the CLOSE/OPEN is then optionally followed in FIG. 2B by an ERODE 16 and optional EXPAND 18 to original scale.

Because the SEs used for the OPENs and CLOSEs in FIGS. 2A and 2B are composed of solid hits and are in all cases separable, the OPENs and CLOSEs in FIG. 2A can be substituted with and performed most efficiently by performing the EROSIONs and DILATEs sequentially using, first, a one-dimensional horizontal SE, followed by a one-dimensional vertical SE. The net effect of sequential ERODE by a horizontal and then a vertical SE is the same as if the image were ERODED by the outer product of the horizontal and vertical elements. This process is illustrated in FIG. 3A for a separable OPEN. In FIG. 3A, the image is eroded in step 28 with a 1×4 SE. Thereafter, in step 30 an ERODE is conducted using a 4×1 SE. In steps 32 and 34, respectively, a DILATE with a 1×4 SE and DILATE with a 4×1 SE are conducted. The 4×4, 1×4, and 4×1 SEs are illustrated in FIG. 3C. For a separable CLOSE, as shown in FIG. 3B, DILATEs 32 and 34 may be followed by ERODEs 28 and 32.

FIG. 4 illustrates in greater detail step 4 of FIG. 1 in which the HM are extracted from the HI and the HR mask. The HI is first INVERTed in step 36 and the result of the INVERT is ANDed in step 38 with the HR mask from FIG. 2. An OPEN 40 is then optionally conducted with a small (e.g., 2×2) SE to clean up any single or double pixel noise, leaving the highlight marks (HM).

FIG. 5 illustrates step 6 of FIG. 1 in greater detail. The binary mark image (MI) (derived from the gray scale image by thresholding) is first CLOSED in step 42 with a small (e.g., 2×2) to fill any holes in the marks caused by the filtering that produced the binary MI. The result of the CLOSED MI then acts as a "clipping" mask. In step 44 the HM is used as a seed, growing it and clipping to the MI mask using a FILLCLIP. Output is taken at either or both of two stages:

a) after a small number (e.g., 2) of iterations, i.e., with a slightly filled HM; and b) after completion.

The latter output gives the WM and the PM, in their entirety (otherwise referred to herein as AM), that are either wholly or partially highlighted in the HI.

FIG. 6 shows the details of step 8 of FIG. 1 in which only those marks which have been entirely highlighted are extracted. The WM and PM are XORed in step 46 with the slightly filled highlight marks to give only the unhighlighted part of the PM. This acts as a seed in FILLCLIP step 48 in which the seed is grown while clipping to the MI. The result is the PM. The WM are then extracted in step 50 by XORing the PM with the sum of the PM and WM.

FIG. 7 shows the details of the FILLCLIP operation in, for example, step 44 where the FILLCLIP is taken to completion. The seed image, on the first iteration, is copied in step 52 and then DILATED in step 54 by, for example, a 3×3 SE or other nearly solid SE and ANDed in step 56 with the mask. Completion is tested in step 58 and demonstrated when the DILATE/AND sequence does not substantially alter the image. The resulting image consists of all 8-connected regions that have a non-empty intersection with the original seed. If the completion test is not met, the partially, filled seed is stored and the process is repeated.

D. Discussion of Illustrative Alternative Methods

1. General

FIG. 8 illustrates an alternative method for extracting the WM alone, using only the HI. In steps 60, 62, and 64 the HI is REDUCED twice at LEVEL=4 and then reduced once at LEVEL=1 to SCALE=8. These steps remove virtually all noise, but preserve the mark holes in the highlighted region. At SCALE=8, holes remaining in the image where marks were previously located are filled to produce minimum enclosing rectangles for the highlighted regions (bounding boxes). This can be done either with a CLOSE or, preferably, by using an iterated EXTRACT sequence 66. The resulting bounding boxes are then used to extract holes within the bounding boxes at step 68. The resulting holes, which correspond to a coarse version of the highlighted marks, are then EXPANDED to full size at step 70 and used as the seed for a FILLCLIP at step 72. The mask for the FILLCLIP is produced by inverting the HI at step 74. The result of the FILLCLIP is the WM, i.e., the set of wholly highlighted marks.

FIG. 9 illustrates the EXTRACT process of step 66 in greater detail. In general, the process includes an iterated sequence of ERODEs and DILATEs using two diagonal SEs (illustrated in the right hand portion of FIG. 9) resulting in the filling of all 8-connected regions to the smallest possible enclosing rectangles. Initially, the original image is copied at step 76. After an ERODE at step 78, for every pixel in the image that matches the pattern of the first diagonal SE, the matched pixel is dilated by the second SE at step 80, and the result is ORed with the original image at step 82. This resulting image is copied at step 84 and treated in reverse, i.e., the image is ERODED at step 86 with the second SE and DILATED at step 88 with the first SE. At step 90 the result is then ORed with the second copied image. The result is then XORed with the original image at step 92 and the process is repeated until the image stops changing, which occurs when the XOR results in the negative image (i.e., no ON pixels).

FIG. 10 shows details of the EXTRACT step 68 in FIG. 8. HI-red represents the reduced image that is input from step 66. BB-red represents the reduced bounding boxes that are output from step 92 in FIG. 9. The HI-red image is XORed with the BB-red image at step 94. At step 96 the BB-red is ERODED with a 3×3 SE and the result of the ERODE is XORed at step 98 with the BB-red to give the boundary of the bounding box. The result of step 98 is ANDed at step 100 with the result of XOR 94 to give a boundary seed. The boundary seed is used in FILLCLIP 102, clipping with the BB-red, and the result is XORed with the result of XOR 94 at step 104 to give, in inverted pixels, the holes in the HI. It is believed that about eight iterations in step 68 will give good results with many images.

It is to be recognized that steps 66 and 68 in combination define a useful method of extracting the insides of loops from marks composed of ON pixels. The loops are 8-connected regions of ON pixels that contain 4-connected regions of OFF pixels within them. This methodology will, of course, find application in areas other than identification of highlighted regions. FIG. 11 (discussed further below) illustrates this aspect of the invention in greater detail.

2. Extraction of Highlight Regions in a Copier a. Color Copier Applications

The above embodiments are directed primarily to extraction of marks in a grayscale image as it would be used in, for example, character identification. When applied to, for example color highlight copiers, certain modifications will be desirable.

One application of this invention is to a color highlight electronic copier that uses a grayscale (but not color) input scan bar. Highlight color prints have both black and one (or possibly more) color marks. A typical highlight color print uses red marks for the highlighted parts and black for the rest.

If it is desired to copy a highlight color print in such a way as to reproduce the highlight color, it is necessary first to identify the highlight color regions. This can be done by generating an electronic representation of the image using a color scan bar. However, color input scanners are expensive, compared to ordinary scanners that detect monochromatic grayscale. Thus, it would be of considerable benefit to be able to detect the color regions using an ordinary grayscale scannner. These color regions then can be printed out in highlight color using means well known to those of skill in the art, along with conventional black and, optionally, white reproduction of remaining portions of the document, thus producing a "copy" of the original.

The methods used for extraction of marks whose surrounding areas have been highlighted with color (such as with a color highlighting pen) can also be used to identify the color regions of a highlight color image, where the marks themselves are colored, but the background is not.

The highlight image (HI), produced by bandpass thresholding the grayscale image, in this case gives the colored marks plus outlines of the other marks. The latter, which are thin relative to the colored marks, must be removed. Image processing requires the following a. Removal of the noise (outlines of non-colored marks) is accomplished by OPENing with a small SE. However, this will also damage the colored marks to some extent.

b. To "fix" the colored marks, the remaining image is used as a seed and FILLCLIPPED into a mask composed of either:

(i) the original, unaltered HI, or (ii) the mark image (MI), which is generated by thresholding the binary image in such a way as to let through both highlight color and black pixels.

All of the above operations may be conducted at full or reduced scale.

b. Monochrome Copier Applications

The present invention could also be applied to reproduce an image in a monochrome copier such that highlighted regions are reproduced in, for example, a stippled format, or a format in which the highlighted text is surrounded by a stippled region. The original document could of course be highlighted by way of either colored text, by way of color markings which enclosed the highlighted regions such as a color loop of a color highlight pen marking.

To reproduce marks surrounded by color highlighting, the HM are extracted and then printed as stipples. To reproduce marks that were colored in the original as stippled in the copy, colored marks or regions are extracted by starting with the HI and removing noise using a small OPEN. When regions are marked by a color highlighter pen and it is desired to print the text as black surrounded by stipples, it may be desirable in some embodiments to insure that none of the stipples touch the black text.

FIG. 13 illustrates a method for generating a monochrome image in which highlighted marks in the original are surrounded by a stipple region, but in which the stipple region does not contact the marks. In step 130 the MI is copied and saved for later use. In step 132 the MI is DILATED using for example a 3×3 SE. The result of step 132 is XORed with the MI at step 134 resulting in an image of boundary pixels to the MI. This image is inverted at step 136 for later use.

In step 138 a desired stipple pattern is generated which covers the entire image. At step 140 the stipple background is ANDed with the HR (highlight region mask) and the result of this AND is ORed with the MI at step 142. The results of steps 142 and 140 are ANDed at step 144 to provide an image in which the highlighted marks are surrounded by stipples which lead up to but do not touch the marks.

3. Hybrid Resolution System

The invention may provide for a hybrid system using a low resolution (e.g., 75 pixel/in) grayscale image and a high resolution (e.g., 300 pixel/in) binary image. The grayscale image is bandpass thresholded to produce a binary highlight image (HI). Thresholding for production of the binary image is set to give the mark image (MI), composed of only the dark pixels of the image.

Two images are used for reasons of computational speed and efficiency: it is not necessary to derive the highlighted regions from a high resolution (e.g., 300 pixel/in) grayscale image. In fact, a scan at 75 grayscale pixels/in is sufficient for derivation of an accurate description of the highlighted regions. After these regions are identified, their coordinates are then used on the high resolution binary MI image to lift the text (or whatever has been highlighted). This highlighted binary text can then be processed either to fill or to remove partially highlighted marks, after which the selected highlighted text can be sent to an OCR system for conversion to a compressed digital representation such as 8-bit ASCII.

The first step is to construct a data structure that represents the highlighted regions. This is found from the HI (the low resolution bandpass-thresholded grayscale image) using the following steps:

a. OPEN the image using a 3×3 SE to remove most of the ON pixels that are outside the highlighted regions.

b. CLOSE the image to consolidate the highlighted regions. The CLOSE preferably uses a 20×15 SE. For efficiency, a separable SE may be used and operated sequentially in horizontal and vertical directions with a one-dimensional SE.

c. Optionally, OPEN the image to remove remaining pixels outside of the highlighted regions. If a large SE is used in step (a), it is not needed. Otherwise, a 10×15 SE is used. Again this may be operated sequentially in horizontal and vertical directions with one-dimensional SEs for efficiency.

d. Optionally, DILATE the highlighted region somewhat using a 5×5 SE.

e. Fill the highlighted regions into solid bounding boxes. To reduce the number of operations necessary to fill the regions to their enclosing bounding boxes, one or two thresholded LEVEL=1 reductions can be used prior to the bounding box fill.

f. Identify the coordinates of the corners of each box. The corners of the bounding boxes can be extracted by ERODING with 2×2 hit-miss SEs that match for each corner separately. These corners can then be aggregated into a data structure that represents each rectangular region.

The data structure representing the highlighted regions is then used, as mentioned above, to extract the marks in the highlighted regions from the high resolution binary MI.

The second step is one where the extracted binary image is cleaned up. For example, to remove partially highlighted marks, leaving only those marks that are entirely highlighted, the following steps are used:

a. Display a one pixel-wide boundary, just outside of each highlighted region.

b. AND the image with these boundaries to generate seed pixels within marks that touch the boundaries to generate seed pixels within marks that touch the boundries, which are intended to be removed.

c. Do a FILLCLIP operation, growing these seeds by alternately DILATING with a 3×3 SE and clipping (ANDing) to the MI. The result, at completion, are the set of PM.

d. Finally, XOR the PM with the MI to remove the PM.

4. Highlighting by Circling With a Color Highlight Mark

The present invention also provides a fast, natural method for highlighting a region of a document. The "highlighted" portions in this case are identified by circling desired portions with a colored pen. As in the color highlight electronic copier, it is advantageous to use an inexpensive grayscale scanner instead of a color scanner to scan the document.

Identification of the highlighted region where the region is identified by a colored circle requires two steps:

a. Identification of the highlighting marks.

b. Generation of a data structure that represents the region labeled by the highlight marks.

Step (a) is accomplished by essentially the same procedure as described above for the color highlight electronic copier. This uses either (i) a HI, or (ii) both a HI and a MI.

Step (b) has the potential complication that there is no guarantee that the highlight curve is closed. Thus, step (b) breaks into two sub-steps: first, to find the "inside" of an open or broken curve, and second, to find the marks contained within this region.

There are many ways to find the "inside" of the open curve. The present invention provides a morphologically-based method that can be implemented with great efficiency. The highlight image is CLOSED sequentially with a set of SEs that represent lines oriented in a variety of directions. The minimal set of SEs that will suffice is two: a horizontal SE and a vertical SE. Any SE that is of sufficient length and correct orientation to span a break in the curve will close that break.

If the curve is repaired and becomes closed by this procedure, the problem of identifying the region enclosed by the curve still exists. This may be overcome by using a region filling method that starts from a seed pixel within the region, and results in a region that is entirely filled with ON pixels.

However, using the morphological CLOSE operations on a reduced image (or on the image at a variety of reduction scales), the filled region is obtained directly using only the morphological operations, even when the highlight bounding curve is not closed. Again, the minimal set of SEs that will suffice for filling the region is two: a horizontal SE and a vertical SE.

The process is illustrated in FIGS. 12A through 12E. The image shown in FIG. 12A is reduced as shown in FIG. 12B sufficiently that the line SEs are large enough to span the highlighted region, at least in the orientation of minimal width. This reduced image is CLOSED with each SE in the set shown in FIG. 12C resulting in the image in FIG. 12D. Each SE represents a line with a different orientation to provide the image shown in FIG. 12D. The cycle is then repeated once. The result will be a solid mask of ON pixels that cover the "region" as shown in FIG. 12E. Finally, the region is EXPANDED back to full scale.

The cycle is conducted twice since the first time only the short dimension may be spanned at the end of the cycle. If there are contour breaks here, a solid fill will not be obtained. A second round of CLOSEs will complete the job as shown in FIG. 12E. Once the highlighted region has been filled, the marks inside this region are simply found by ANDing the filled "mask" with the MI.

5. Extraction of the Inside of Loops From Marks Composed of ON Pixels

Steps 66 and 68 provide a useful method of extracting the inside of loops from marks composed of ON pixels. This technique could be used in optical character recognition systems and the like. FIG. 11 illustrates in graphic form the extraction of pixels from the inside of a loop of ON pixels which, by way of example, is the letter "O."

Six lines of operations are shown. In line 1, the FILL8 operation iteratively fills the image, stopping when a minimal bounding box 91 containing the "O" has been obtained. In line 2, the original "O" is then XORed with the bounding box 91 to produce a 5-connected region 93 with the inverted loop in the center. Note that the loop does not touch the boundary, as mentioned above.

Lines 3 and 4 generate a requisite boundary "seed" 95 for later filling. In line 3, the bounding box is eroded (denoted by $\theta$) by a $3 \times 3$ square structuring element. This removes all boundary pixels on the bounding box. These removed pixels are recovered by XORing with the bounding box. In line 4, the intersection of the 5-piece image with the bounding box boundary gives the boundary seed 95. In line 5, a FILLCLIP operation is used to fill from the seed, but at each iteration clipping to the 5-region image. When completed, four of the regions are regenerated, but the inside of the loop is missing because no part of the seed was within it. Finally the 4- and 5-region images are XORed to get the inside of the loop. Line 6 illustrates ANDing the original image.

E. Discussion of the Software

Appendix 1 (©, 1991, Xerox Corporation) provides a source code program for implementation of one embodiment of the invention provided herein. The program is in the "C" language, well known to those of skill in the art. The program has been demonstrated on Sun3 and Sun4 workstations, although it will be apparent to those of skill in the art that a wide variety of programming languages and hardware configurations could readily be used based on this disclosure without departing from the scope of the invention. Merely by way of example, the invention could be implemented wholly or in part in a main frame computer, a microprocessor based system, discrete hardware, and combinations thereof.

F. Graphical Illustration

FIGS. 14A to 14H illustrate in graphical form operation of the invention generally in accord with the process as shown in FIG. 2A. In particular, FIG. 14A illustrates the HI input to the process shown in FIG. 1B. The HI in this particular case includes a line 110 of highlighted text and a line 112 of non-highlighted text. Band passing of the image has resulted in dark regions 114 around the highlighted text with light regions 116 where the highlighted text was once located. The non-highlighted text has survived only as outline images 118. A significant amount of noise 120 has also survived.

FIG. 14B illustrates the image of FIG. 14A after an OPEN as shown in, for example, step 12 of FIG. 2A. Nearly all of the noise has been removed, as well as the outlines of the non-highlighted characters. The holes 116 have become connected at many locations.

FIG. 14C illustrates the image of FIG. 14B after a CLOSE step as in, for example, step 14 of FIG. 2A. The CLOSE results in a HR mask which is almost entirely ON pixels in the region previously highlighted.

FIG. 14D illustrates the inverse bit map of the image shown in FIG. 14A and as shown in step 36 of FIG. 4. This inverted image is used as shown in FIG. 4 in an AND step 38 with the HR mask of FIG. 14C to produce the HM image. In the particular example shown in FIGS. 14A to 14E there are no partial marks, so the WM is the same as the HM.

FIGS. 15A to 15C illustrate graphically the operation of the invention in accord with the embodiment of FIG. 2B. In particular, FIG. 15A illustrates the resulting image from a reduction of the HI with LEVEL=4. The noise and outline regions in the non-highlighted regions have been eliminated in large part, while the highlighted region of the image has been solidified.

FIG. 15B illustrates the image after an additional reduction of the image shown in FIG. 15A. As in the previous example, the noise and un-highlighted character outlines have been substantially eliminated, leaving only a dark outline of the highlighted characters.

FIG. 15C illustrates the image after closing the image shown in FIG. 15B. As in FIG. 14C, the result is a mask which may be used to retrieve the marks in the highlighted region. The mask shown in FIG. 15C is used in a fashion similar to that shown in FIG. 14C and provides a similar result.

G. Fast Thresholded Reduction (and Expansion) of Images

One requirement of efficient segmentation, is that thresholded reduction must be done quickly. Suppose it is desired to reduce an image by a factor of two in the vertical direction. One way to do this is to use a raster operation (bitbit—bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1. Likewise, if an AND for both raster operation orientations. Likewise, if an AND for both raster operation orientations, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact when the algorithm is implemented entirely with raster operations, over 90% of the time is devoted to the vertical operations.

Fortunately, there is a simple and very fast way to implement the logical operations between columns. Rather than use column raster operations, take 16 sequential bits, corresponding to 16 columns in one row. These 16 bits can be accessed as a short integer. These 16 bits are used as an index into a $2^{16}$-entry array (i.e., a lookup table) of 8-bit objects. The 8-bit contents of the array give the result of ORing the first bit of the index with the second, the third bit with the fourth... and on the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.25 seconds. On a Sun 4/260, the operation takes about ⅛ second.

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 16 is a logic schematic of specialized hardware for performing a logical operation between vertically adjacent 2Q-bit pixelwords and a pairwise bit reduction of the resulting 2Q-bit pixelword (bits 0 through 2Q-1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, only four registers 205, 206, 207, and 208 of one 16-bit device 210 are shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits 0 through (Q-1) of the data bus, while port 222b is coupled to bits Q through (2Q-1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, . . . (2Q-1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even-/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

H. Conclusion

The present invention provides a greatly improved method and apparatus for detection and extraction of highlighted regions of a document. It is to be understood that the above description is intended to be illustrative and not restrictive. Many variations of the invention will become apparent to those of skill in the art upon review of this disclosure. The above alternative methods of conducting the method are illustrative of the variations which could be implemented by those of skill in the art. The scope of the invention should, therefore, be determined not with reference to the above description, but instead should be determined with reference to the appended claims along with their full scope of equivalents.

What is claimed is:

1. A method for processing a first image in a digital computer to identify a location of highlight regions in said first image, said first image comprising mark regions having a first grayscale, a highlighted portion of said marks at least partially surrounded by said highlight regions, said highlight regions having a second grayscale, comprising the steps of:
   a) inputting a grayscale image of said first image;
   b) identifying a location of said portion of said marks in said first image using said grayscale image, said step of identifying a location further comprising the step of converting said highlight regions to substantially solid regions, said substantially solid regions corresponding to said highlight regions; and
   c) using said substantially solid regions in combination with an image comprising at least marks of said first image to extract a second image, said second image comprising said highlighted portion of said marks.

2. The method as recited in claim 1 wherein said second image comprises an entirety of marks partially within said substantially solid regions.

3. The method as recited in claim 1 further comprising the step of identifying characters in said substantially solid regions.

4. The method as recited in claim 1 preceded by the step of forming said highlighted regions with a color highlight pen.

5. The method as recited in claim 1 wherein said second image comprises marks fully surrounded by said highlight regions.

6. The method as recited in claim 2 wherein the second image consists essentially of characters partially and fully surrounded by said highlight regions.

7. The method as recited in claim 1 wherein the step of identifying further comprises the step of band-pass filtering said grayscale image to produce a highlight image, said highlight image filled to produce said substantially solid regions.

8. The method as recited in claim 7 wherein the step of filling further comprises the step of producing a highlight region mask from said highlight image, said mask comprising substantially solid ON pixels in said highlight regions.

9. A method for processing a first image in a digital computer to identify a location of highlight regions in said first image, said first image comprising mark regions having a first grayscale, a highlighted portion of said marks at least partially surrounded by said highlight regions, said highlight regions having a second grayscale, comprising the steps of:
   a) inputting a grayscale image of said first image;
   b) identifying a location of said portion of said marks in said first image using said grayscale image, said step of identifying a location further comprising the step of converting said highlight regions to substantially solid regions, said substantially solid regions corresponding to said location of said portions of said marks;
   c) producing a highlight image;
   d) band-pass filtering said grayscale image to produce a highlight image, said highlight image filled to produce said substantially solid regions; and
   e) producing a highlight region mask from said highlight image further comprising the steps of:
      i) opening said highlight image with a structuring element of substantially solid ON entries to produce a first intermediate image; and
      ii) closing said first intermediate image to substantially fill mark regions and produce said highlight region mask.

10. The method as recited in claim 9 further comprising the step of eroding said highlight region mask.

11. The method as recited in claim 10 wherein the step of eroding shrinks a boundary of said second intermediate image by about one pixel.

12. The method as recited in claim 9 wherein the step of opening is preceded by the step of reducing said highlight image.

13. A method for processing a first image in a digital computer to identify a location of highlight regions in said first image, said first image comprising mark regions having a first grayscale, a highlighted portion of said marks at least partially surrounded by said highlight regions, said highlight regions having a second grayscale, comprising the steps of:
   a) inputting a grayscale image of said first image;
   b) identifying a location of said portion of said marks in said first image using said grayscale image, said step of identifying a location further comprising the step of converting said highlight regions to substantially solid regions, said substantially solid regions corresponding to said location of said portions of said marks;
   c) producing a highlight image;
   d) band-pass filtering said grayscale image to produce a highlight image, said highlight image filled to produce said substantially solid regions; and
   e) producing a highlight region mask from said highlight image further comprising the step of reducing said highlight image at least once to produce said mask.

14. The method as recited in claim 13 wherein the step of reducing is followed by the step of closing said mask.

15. The method as recited in claim 13 wherein the step of reducing comprises first and second reduction steps.

16. The method as recited in claim 15 wherein said second reduction step has a lower threshold level than said first reduction step.

17. The method as recited in claim 13 further comprising the step of opening said highlight region mask.

18. The method as recited in claim 17 further comprising the step of eroding said highlight region mask.

19. The method as recited in claims 12 or 13 further comprising the step of expanding said highlight region mask.

20. The method as recited in claims 9 or 17 wherein the step of opening further comprises the steps of eroding and then dilating with one-dimensional structuring elements.

21. The method as recited in claims 9 or 17 wherein the step of opening further comprises the steps of:
   a) eroding with one-dimensional vertical structuring elements; and
   b) dilating with one-dimensional horizontal structuring elements.

22. The method as recited in claims 9 or 14 wherein the step of closing further comprises the steps of dilating and then eroding with one-dimensional structuring elements.

23. The method as recited in claim 21 wherein the steps of eroding and dilating further comprise the steps of:
   a) eroding with one-dimensional horizontal structuring element;
   b) eroding with one-dimensional vertical structuring element;
   c) dilating with a one-dimensional horizontal structuring element; and
   d) dilating with a one-dimensional vertical structuring element.

24. The method as recited in claim 22 wherein the steps of dilating and eroding further comprise the steps of:
   a) dilating with a one-dimensional horizontal structuring element;
   b) dilating with a one-dimensional vertical structuring element;
   c) eroding with one-dimensional horizontal structuring element; and
   d) eroding with one-dimensional vertical structuring element.

25. A method for processing a first image in a digital computer to identify a location of highlight regions in said first image, said first image comprising mark regions having a first grayscale, a highlighted portion of said marks at least partially surrounded by said highlight regions, said highlight having a second grayscale, comprising the steps of:
   a) inputting a grayscale image of said first image;

b) identifying a location of said portion of said marks in said first image using said grayscale image, said step of identifying a location further comprising the step of converting said highlight regions to substantially solid regions, said substantially solid regions corresponding to said location of said portions of said marks;
c) producing a highlight image;
d) band-pass filtering said grayscale image to produce a highlight image, said highlight image filled to produce said substantially solid regions; and
e) forming a second highlight mark image by the steps of:
i) inverting said highlight image to produce an inverted highlighted image; and
ii) ANDing said inverted highlighted image with said substantially solid regions to produce said highlight mark image.

26. The method as recited in claim 25 further comprising the step of opening said highlight mark image.

27. The method as recited in claim 25 further comprising the step of using said highlight mark image as a seed to produce a whole mark image.

28. The method as recited in claim 27 wherein the step of producing a whole mark image further comprises the steps of:
a) closing a highlight mark image to produce a mark mask; and
b) fillclipping said mark mask to said highlight mark image.

29. The method as recited in claim 27 wherein the whole mark image is used to produce a wholly highlighted mark image by:
a) XORing a slightly filled highlighted mark image and a sum of said whole marks and partial mark images to produce a first seed;
b) fillclipping said first seed using a mark image as a mask to produce a partial mark image; and
c) XORing said partial mark image with said sum image to produce said wholly highlighted mark image.

30. The method as recited in claim 28 or 29 wherein said fillclip step further comprises the steps of:
a) copying a seed image;
b) dilating said seed image to produce a dilated seed image;
c) ANDing said dilated seed image with said mask image to produce a partially filled seed;
d) XORing said partially filled seed with said copied seed image;
e) testing to determine if a change has been made;
f) if a change has been made, copying said partially filled seed image and repeating from step b; and
g) if a change has not been made, outputting said partially filled seed as a filled seed.

31. A method as recited in claim 3 wherein said step of identifying a location uses a first resolution image and said step of identifying characters uses a second resolution image, said second resolution substantially higher than said first resolution.

32. A method as recited in claim 31 wherein said first resolution is about 75 pixels/inch and said second resolution is about 300 pixels/inch.

33. A method for processing a first image in a digital computer to identify a location of highlight regions in said first image, said first image comprising mark regions having a first grayscale, a highlighted portion of said marks at least partially surrounded by said highlight regions, said highlight regions having a second grayscale, comprising the steps of:
a) inputting a grayscale image of said first image;
b) identifying a location of said portion of said marks in said first image using said grayscale image, said step of identifying a location further comprising the step of converting said highlight regions to substantially solid regions, said substantially solid regions corresponding to said location of said portions of said marks;
c) producing a highlight image;
d) band-pass filtering said grayscale image to produce a highlight image, said highlight image filled to produce said substantially solid regions; and
e) filling said highlight image to produce substantially solid regions, wherein said highlight regions comprise loops and wherein said step of converting to substantially solid regions further comprises the step of closing said highlight image with a plurality of structuring elements, said plurality of structuring elements comprising lines of ON pixels oriented in at least two directions to produce said substantially solid regions.

34. The method as recited in claim 33 further comprising an additional step of closing with said plurality of structuring elements when at least a portion of said loops are broken.

35. A digital computer programmed to process a first image to identify a location of highlight regions in said first image, said first image comprising mark regions having a first grayscale, a highlighted portion of said marks at least partially surrounded by said highlight regions, said highlight regions having a second grayscale, comprising:
a) means to input a grayscale image of said first image;
b) means programmed to identify a location of said portion of said marks in said first image using said grayscale image, said means for identifying a location programmed to convert said highlight regions to substantially solid regions, said substantially solid regions corresponding to said highlight regions; and
c) means to use said substantially solid regions in combination with an image comprising marks of said first image to extract a second image, said second image comprising said highlighted portion of said marks.

36. The computer as recited in claim 35 wherein said second image comprises an entirety of marks partially within said substantially solid regions.

37. The computer as recited in claim 35 further programmed to identify characters in said substantially solid regions.

38. The computer as recited in claim 37 wherein said substantially solid regions comprise greater than about 90% ON pixels.

39. The computer as recited in claim 35 further programmed to form a second image, said second image comprising marks fully surrounded by said highlight regions.

40. The computer as recited in claim 35 wherein said second image comprises characters partially and fully surrounded by said highlight regions.

41. The computer as recited in claim 35 further programmed to band-pass filter said grayscale image to produce a highlight image, said highlight image filled to produce said substantially solid regions.

42. The computer as recited in claim 41 further to produce a highlight region mask from said highlight image, said mask comprising substantially solid ON pixels in said highlight regions.

43. A digital computer programmed to process a first image to identify a location of highlight regions in said first image, said first image comprising mark regions having a first grayscale, a highlighted portion of said marks at least partially surrounded by said highlight regions, said highlight regions having a second grayscale, comprising:
   a) means to input a grayscale image of said first image;
   b) means programmed to identify a location of said portion of said marks in said first image using said grayscale image, said means for identifying a location programmed to convert said highlight regions to substantially solid regions, said substantially solid regions corresponding to said location of said portions of said marks;
   c) means programmed to band-pass filter said grayscale image to produce a highlight image, said highlight image filled to produce said substantially solid regions;
   d) means programmed to produce a highlight region mask from said highlight image, said mask comprising substantially solid ON pixels in said highlight regions; and
   e) means programmed to produce said highlight region mask from said highlight image by the steps of:
      i) opening said highlight image with a structuring element of substantially solid ON entries to produce a first intermediate image; and
      ii) closing said first intermediate image to substantially fill mark regions and produce said highlight region mask.

44. The computer as recited in claim 43 further programmed to erode said highlight region mask.

45. The computer as recited in claim 44 wherein eroding shrinks a boundary of said second intermediate image by about one pixel.

46. The computer as recited in claim 43 wherein opening is preceded by the step of reducing said highlight image.

47. A digital computer programmed to process a first image to identify a location of highlight regions in said first image, said first image comprising mark regions having a first grayscale, a highlighted portion of said marks at least partially surrounded by said highlight regions, said highlight regions having a second grayscale, comprising:
   a) means to input a grayscale image of said first image;
   b) means programmed to identify a location of said portion of said marks in said first image using said grayscale image, said means for identifying a location programmed to convert said highlight regions to substantially solid regions, said substantially solid regions corresponding to said location of said portions of said marks;
   c) means programmed to band-pass filter said grayscale image to produce a highlight image, said highlight image filled to produce substantially solid regions;
   d) means programmed to produce a highlight region mask from said highlight image, said mask comprising substantially solid ON pixels in said highlight regions; and
   e) means programmed to produce said highlight region mask from said highlight image by the step of reducing said highlight image at least once to produce said mask.

48. The computer as recited in claim 47 further programmed to close said mask.

49. The computer as recited in claim 47 wherein the reduction comprises first and second reduction steps.

50. The computer as recited in claim 49 programmed such that said second reduction step has a lower threshold level than said first reduction step.

51. The computer as recited in claim 47 further programmed to open said highlight region mask.

52. The computer as recited in claim 51 further programmed to erode said highlight region mask.

53. The computer as recited in claims 46 or 47 further programmed to expand said highlight region mask.

54. The computer as recited in claim 43 or 51 wherein the computer is programmed to open by the steps of eroding and then dilating with one-dimensional structuring elements.

55. The computer as recited in claims 43 or 51 programmed to open by the steps of:
   a) eroding with one-dimensional vertical structuring elements; and
   b) dilating with one-dimensional horizontal structuring elements.

56. The computer as recited in claims 45 or 48 wherein the computer is programmed to close with the steps of dilating and then eroding with one-dimensional structuring elements.

57. The computer as recited in claim 54 programmed to erode and dilate by the steps of:
   a) eroding with one-dimensional horizontal structuring element;
   b) eroding with one-dimensional vertical structuring element;
   c) dilating with a one-dimensional horizontal structuring element; and
   d) dilating with a one-dimensional vertical structuring element.

58. The computer as recited in claim 56 programmed to dilate and erode by the steps of:
   a) dilating with a one-dimensional horizontal structuring element;
   b) dilating with a one-dimensional vertical structuring element;
   c) eroding with one-dimensional horizontal structuring element; and
   d) eroding with one-dimensional vertical structuring element.

59. A digital computer programmed to process a first image to identify a location of highlight regions in said first image, said first image comprising mark regions having a first grayscale, a highlighted portion of said marks at least partially surrounded by said highlight regions, said highlight regions having a second grayscale, comprising:
   a) means to input a grayscale image of said first image;
   b) means programmed to identify a location of said portion of said marks in said first image using said grayscale image, said means for identifying a location programmed to convert said highlight regions to substantially solid regions, said substantially solid regions corresponding to said location of said portions of said marks;

c) means programmed to band-pass filter said grayscale image to produce a highlight image, said highlight image filled to produce said substantially solid regions;

d) means programmed to produce a highlight region mask from said highlight image, said mask comprising substantially solid ON pixels in said highlight regions; and e) means programmed to form a second image by the steps of:
  i) inverting said highlight image to produce an inverted highlighted image; and
  ii) ANDing said inverted highlighted image with said highlight region mask to produce a highlight mark image.

60. The computer as recited in claim 58 further programmed to open said highlight mark image.

61. The computer as recited in claim 53 further programmed to use said highlight mark image as a seed to produce a whole mark image.

62. The computer as recited in claim 61 programmed to produce said whole mark image by the steps of:
  a) closing a highlight mark image to produce a mark mask; and
  b) fillclipping said mark mask to said highlight mark image.

63. The computer as recited in claim 61 programmed to produce a wholly highlighted mark image from the whole mark image and a partial mark sum image by:
  a) XORing a slightly filled highlighted mark image and a sum of said whole marks and partial mark images to produce a first seed;
  b) fillclipping said first seed using a mark image as a mask to produce a partial mark sum image; and
  c) XORing said partial mark image with said sum image to produce said wholly highlighted mark image.

64. The computer as recited in claims 62 or 63 programmed to fillclip by the steps of:
  a) copying a seed image;
  b) dilating said seed image to produce a dilated seed image;
  c) ANDing said dilated seed image with said mask image to produce a partially filled seed;
  d) XORing said partially filled seed with said copied seed image;
  e) testing to determine if a change has been made;
  f) if a change has been made, copying said partially filled seed image and repeating from step b; and
  g) if a change has not been made, outputting said partially filled seed as a filled seed.

65. A computer as recited in claim 37 programmed to identify a location using a first resolution image and identify characters using a second resolution image, said second resolution substantially higher than said first resolution.

66. The computer as recited in claim 35 wherein said first resolution is about 75 pixels/inch and said second resolution is about 300 pixels/inch.

67. A digital computer programmed to process a first image to identify a location of highlight regions in said first image, said first image comprising mark regions having a first grayscale, a highlighted portion of said marks at least partially surrounded by said highlight regions, said highlight regions having a second grayscale, comprising:

a) means to input a grayscale image of said first image;

b) means programmed to identify a location of said portion of said marks in said first image using said grayscale image, said means for identifying a location programmed to convert said highlight regions to substantially solid regions, said substantially solid regions corresponding to said location of said portions of said marks; and c) means programmed to band-pass filter said grayscale image to produce a highlight image, said highlight image filled to produce said substantially solid regions, wherein said highlight regions comprise broken loops and wherein said step of converting to substantially solid regions further comprises the step of closing said highlight image sequentially with a plurality of structuring elements, said plurality of structuring elements comprising lines of ON pixels oriented in at least two directions to produce said substantially solid regions.

68. The computer as recited in claim 67 further programmed to close a second time with said plurality of structuring elements.

* * * * *